(12) United States Patent
Zhang et al.

(10) Patent No.: US 10,008,868 B2
(45) Date of Patent: Jun. 26, 2018

(54) ELECTRONIC DEVICE AND POWER ADAPTER, INCLUDING MAIN CONTROL CIRCUIT, THEREOF

(71) Applicant: GUANGDONG OPPO MOBILE TELECOMMUNICATIONS CORP., LTD., Dongguan (CN)

(72) Inventors: Jialiang Zhang, Dongguan (CN); Fuchun Liao, Dongguan (CN); Nianfeng Liu, Dongguan (CN); Kewei Wu, Dongguan (CN); Jun Zhang, Dongguan (CN); Yuanxiang Hu, Dongguan (CN)

(73) Assignee: Guangdong Oppo Mobile Telecommunications Corp., Ltd., Dongguan, Guangdong (CN)

( * ) Notice: Subject to any disclaimer, the term of this patent is extended or adjusted under 35 U.S.C. 154(b) by 0 days. days.

(21) Appl. No.: 15/596,950

(22) Filed: May 16, 2017

(65) Prior Publication Data
US 2017/0250553 A1    Aug. 31, 2017

Related U.S. Application Data

(63) Continuation of application No. 15/114,929, filed as application No. PCT/CN2014/077287 on May 12, 2014.

(30) Foreign Application Priority Data

Jan. 28, 2014    (CN) .......................... 2014 1 0043139

(51) Int. Cl.
*H02J 7/00*    (2006.01)
*H02J 7/02*    (2016.01)

(52) U.S. Cl.
CPC .......... *H02J 7/0029* (2013.01); *H02J 7/0004* (2013.01); *H02J 7/007* (2013.01); *H02J 7/0072* (2013.01);
(Continued)

(58) Field of Classification Search
CPC .......... H02J 7/0029; H02J 7/0072; H02J 7/02; H02J 7/007; H02J 7/0004; H02J 2007/0039; H02J 2007/0096
(Continued)

(56) References Cited

U.S. PATENT DOCUMENTS 5,541,489 A    7/1996 Dunstan
2005/0174094 A1    8/2005 Purdy et al.
(Continued)

FOREIGN PATENT DOCUMENTS

CN    201278420 Y    7/2009
CN    202218051 U    5/2012
(Continued)

OTHER PUBLICATIONS

Korean Patent Application No. 10-2016-7023621, English translation of Notification of Reason for Refusal dated Aug. 9, 2017, 2 pages.
(Continued)

*Primary Examiner* — Edward Tso
*Assistant Examiner* — Manuel Hernandez
(74) *Attorney, Agent, or Firm* — Lathrop Gage LLP

(57) ABSTRACT

An electronic device and a power adapter are provided. The power adapter comprises a power circuit, a main control circuit, a potential adjustment circuit, a current detection circuit, a voltage detection circuit and an output switch circuit. When a conventional charging or a quick charging is performed on the battery in the electronic device, the main control circuit determines whether the output current of the
(Continued)

power adapter is greater than a current threshold according to the current detecting signal and determines whether the output voltage of the power adapter is greater than a voltage threshold according to the voltage detecting signal; if the output current of the power adapter is greater than the current threshold and/or the output voltage of the power adapter is greater than the voltage threshold, the main control circuit controls the output switch circuit to turn off the direct current output of the power adapter.

14 Claims, 2 Drawing Sheets

(52) U.S. Cl.
CPC ......... *H02J 7/02* (2013.01); *H02J 2007/0039* (2013.01); *H02J 2007/0096* (2013.01)

(58) Field of Classification Search
USPC ....................................................... 320/107
See application file for complete search history.

(56) References Cited

U.S. PATENT DOCUMENTS

| | | | |
|---|---|---|---|
| 2008/0231236 A1* | 9/2008 | Watanabe | H02J 7/0006 320/150 |
| 2011/0248670 A1 | 10/2011 | Ymazaki et al. | |
| 2014/0313794 A1* | 10/2014 | Ono | H02M 3/33523 363/21.15 |

FOREIGN PATENT DOCUMENTS

| | | |
|---|---|---|
| CN | 103178595 A | 6/2013 |
| CN | 103370863 A | 10/2013 |
| CN | 103762691 A | 4/2014 |
| CN | 203747392 U | 7/2014 |
| EP | 1455431 A2 | 9/2004 |
| JP | 2004027487 A | 1/2004 |
| JP | 2008061381 A | 3/2008 |

OTHER PUBLICATIONS

Singapore Patent Application No. 11201606223P, Search Report and Written Opinion dated May 19, 2017, 8 pages.
Canadian Patent Application No. 2,936,925 Office Action dated May 16, 2017, 6 pages.
Chinese Patent Application No. 201410043139.4, First Office Action with English translation dated Dec. 23, 2015, 9 pages.
Chinese Patent Application No. 201410043139.4, Notification to Grant Patent Right with English translation dated Aug. 23, 2016, 3 pages.
Translation of the International Search Report and Written Opinion corresponding to International Patent Application No. PCT/CN2014/077287, dated Sep. 29, 2014, 9 pages.
Japanese Patent Application No. 2016-549501 Notification of Reasons for Refusal dated Nov. 14, 2017, 2 pages.
Japanese Patent Application No. 2016-549501 English translation of Notification of Reasons for Refusal dated Nov. 14, 2017, 2 pages.

* cited by examiner

ELECTRONIC DEVICE AND POWER ADAPTER, INCLUDING MAIN CONTROL CIRCUIT, THEREOF

CROSS-REFERENCE TO RELATED APPLICATIONS

This is a continuation application of a U.S. national phase application Ser. No. 15/114,929, filed on Jul. 28, 2016, which is based on International Application No. PCT/CN2014/077287, filed on May 12, 2014, and claiming priority to Chinese Patent Application No. 201410043139.4, filed on Jan. 28, 2014, the entire contents of which are incorporated herein by reference.

TECHNICAL FIELD

The present disclosure generally relates to the charging technical field, and more particularly, to an electronic device and a power adapter.

BACKGROUND

Currently, most electronic devices charge a battery by acquiring direct current from a power adapter through a communication interface thereof. However, in the related art, in order to reduce charging time during charging the battery, the charging current may be enhanced by the power adapter to realize an aim of performing a quick charging on the battery. However, when charging the battery either in a conventional constant voltage mode or with increased charging current, if a charging current and/or charging voltage of the battery is too high during the charging, the battery will be damaged due to overvoltage and/or overcurrent charging. Therefore, in the related art, an overcurrent protection and/or an overvoltage protection cannot be realized for the battery when the power adapter performs a conventional charging or quick charging on the battery in the electronic device.

SUMMARY

An embodiment of the present disclosure provide a power adapter, so as to solve a problem in the related art that an overcurrent protection and/or an overvoltage protection cannot be realized for a battery when the power adapter performs a conventional charging or quick charging on the battery in the electronic device.

An embodiment of the present disclosure is realized as follows. There is provided a power adapter, including a communication interface through which the power adapter charges a battery in an electronic device and performs a data communication with the electronic device. The power adapter includes an EMI filter circuit, a high-voltage rectifying and filtering circuit, an isolation transformer, an output filtering circuit, and a voltage tracking and controlling circuit;

The power adapter further includes a power circuit, a main control circuit, a potential adjusting circuit, a current detection circuit, a voltage detection circuit and an output switch circuit.

An input end of the power circuit is connected with a secondary end of the isolation transformer; a power end of the main control circuit, a power end of the potential adjusting circuit and a power end of the current detection circuit are collectively connected with an output end of the power circuit; both a high-level end of the main control circuit and a high-level end of the potential adjusting circuit are connected with a positive output end of the output filtering circuit; a potential adjusting end of the potential adjusting circuit is connected with the voltage tracking and controlling circuit; a direct current input end of the current detection circuit is connected with the positive output end of the output filtering circuit; a current feedback end of the current detection circuit is connected with a current detecting end of the main control circuit; a clock output end of the main control circuit is connected with a clock output end of the potential adjusting circuit; a data output end of the main control circuit is connected with a data input end of the potential adjusting circuit; a first detecting end and a second detecting end of the voltage detection circuit are connected with a direct current output end of the current detection circuit and a negative output end of the output filtering circuit respectively; a first output end and a second output end of the voltage detection circuit are connected with a first voltage detecting end and a second voltage detecting end of the main control circuit respectively; an input end of the output switch circuit is connected with the direct current output end of the current detection circuit; an output end of the output switch circuit and the negative output end of the output filtering circuit are connected with the communication interface; and the output end of the output switch circuit is connected with a third detecting end of the voltage detection circuit; a ground end of the output switch circuit is connected with the negative output end of the output filtering circuit; a controlled end of the output switch circuit is connected with a switching control end of the main control circuit; a power end of the output switch circuit is connected with the secondary end of the isolation transformer; each of the negative output end of the output filtering circuit, the output end of the output switch circuit and a first communication end and a second communication end of the main control circuit is connected with the communication interface.

The power circuit obtains power supply from the isolation transformer and provides the power supply for the main control circuit, the potential adjusting circuit and the current detection circuit; the potential adjusting circuit drives the voltage tracking and controlling circuit to adjust an output voltage of the isolation transformer according to a control signal sent by the main control circuit; the current detection circuit detects an output current of the power adapter and feeds back a current detecting signal to the main control circuit, and the voltage detection circuit detects an output voltage of the power adapter and feeds back a voltage detecting signal to the main control circuit; the output switch circuit turns on or off a direct current output of the power adapter according to a switching control signal sent by the main control circuit.

When a conventional charging or a quick charging is performed on the battery in the electronic device, the main control circuit determines whether the output current of the power adapter is greater than a current threshold according to the current detecting signal and determines whether the output voltage of the power adapter is greater than a voltage threshold according to the voltage detecting signal; if the output current of the power adapter is greater than the current threshold and/or the output voltage of the power adapter is greater than the voltage threshold, the main control circuit controls the output switch circuit to turn off the direct current output of the power adapter.

During the data communication between the main control circuit and the electronic device, if the electronic device determines that the output current of the power adapter is greater than the current threshold and/or the output voltage of the power adapter is greater than the voltage threshold, and feeds back a charging stop instruction to the main control circuit, the main control circuit controls the output switch circuit to turn off the direct current output of the power adapter according to the charging stop instruction.

An embodiment of the present disclosure is to provide an electronic device, including a battery and further provided with the power adapter described above.

In at least one embodiment of the present disclosure, the power adapter including the power circuit, the main control circuit, the potential adjusting circuit, the current detection circuit, the voltage detection circuit and the output switch circuit is provided for the electronic device. The main control circuit determines whether the output current of the power adapter is greater than the current threshold, and determines whether the output voltage of the power adapter is greater than the voltage threshold. If the output current is greater than the current threshold and/or the output voltage is greater than the voltage threshold, the main control circuit controls the output switch circuit to turn off the direct current output of the power adapter. In addition, if the electronic device determines that an overcurrent and/or overvoltage occurs in the output of the power adapter, and feeds back the charging stop instruction to the main control circuit, the main control circuit controls the output switch circuit to turn off the direct current output of the power adapter according to the charging stop instruction, such that the overcurrent and/or overvoltage protection is realized for the battery.

DETAILED DESCRIPTION

To make objectives, technical solutions, and advantages of embodiments of the present invention clearer, the technical solutions in embodiments of the present invention are hereinafter described clearly and completely with reference to the accompanying drawings in embodiments of the present invention. It should be understood that, the specific embodiments described herein are merely used for explanation, but not used to limit the present disclosure.

Figure 1:
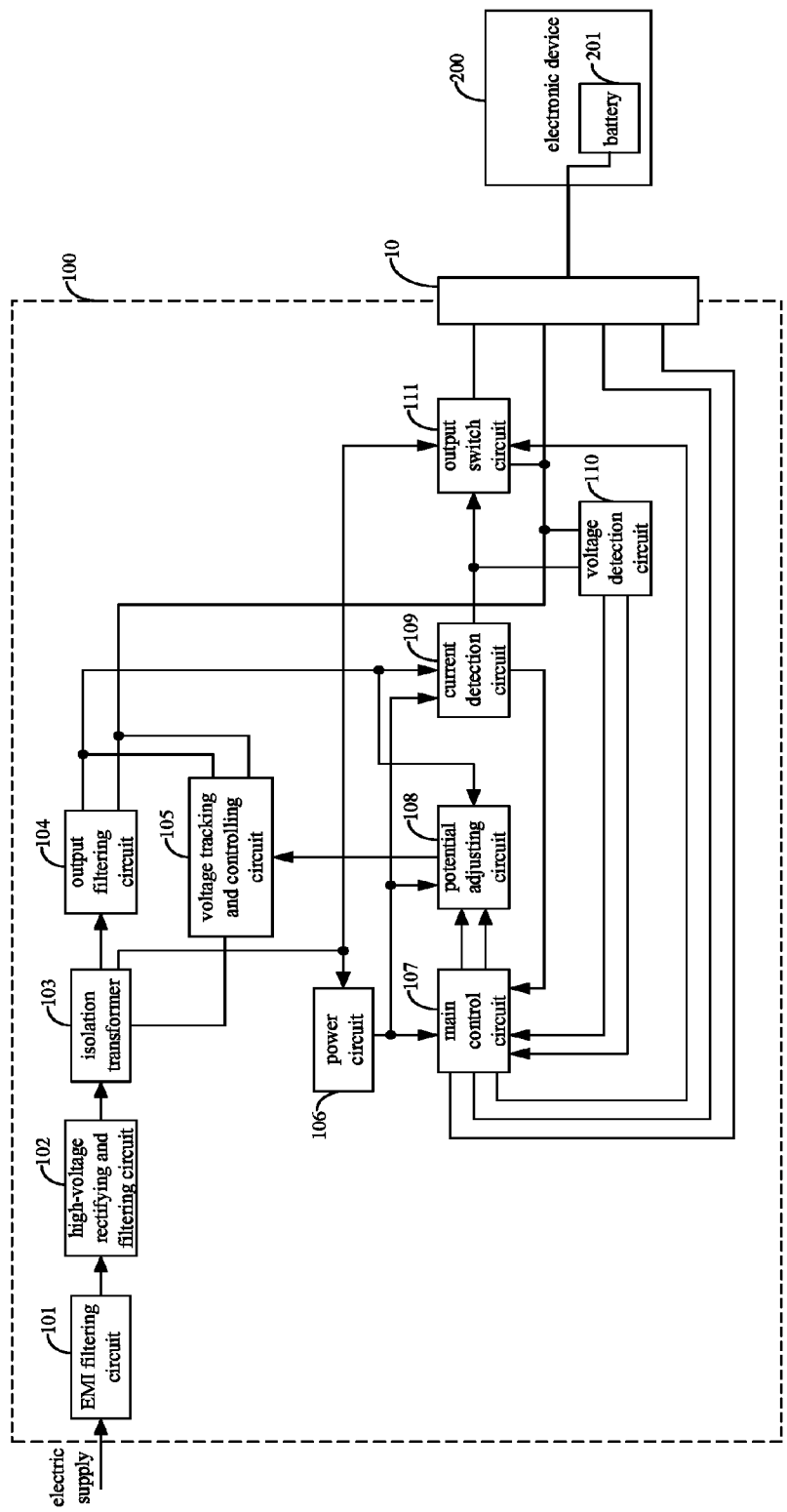
FIG. 1 is a block diagram of a power adapter provided by an embodiment of the present disclosure.

FIG. 1 is a block diagram of a power adapter provided by an embodiment of the present disclosure. For illustration purposes, only parts related to embodiments of the present disclosure are shown, which will be described in detail in the following.

The power adapter 100 provided by an embodiment of the present disclosure includes a communication interface 10, the power adapter 100 charges a battery 201 in an electronic device 200 and performs a data communication with the electronic device 200 through the communication interface 10.

The power adapter 100 includes an EMI filtering circuit 101, a high-voltage rectifying and filtering circuit 102, an isolation transformer 103, an output filtering circuit 104 and a voltage tracking and controlling circuit 105. After an electromagnetic interference filtering is performed on the electric supply by the EMI filtering circuit 101, the high-voltage rectifying and filtering circuit 102 performs a rectifying and filtering process and outputs a high-voltage direct current, which is outputted to the output filtering circuit 104 after the electrical isolation in the isolation transformer 103, for being filtered and used to charge the battery 201. The voltage tracking and controlling circuit 105 adjusts an output voltage of the isolation transformer 103 according to an output voltage of the output filtering circuit 104.

The power adapter 100 further includes: a power circuit 106, a main control circuit 107, a potential adjusting circuit 108, a current detection circuit 109, a voltage detection circuit 110 and an output switch circuit 111.

Figure 2:
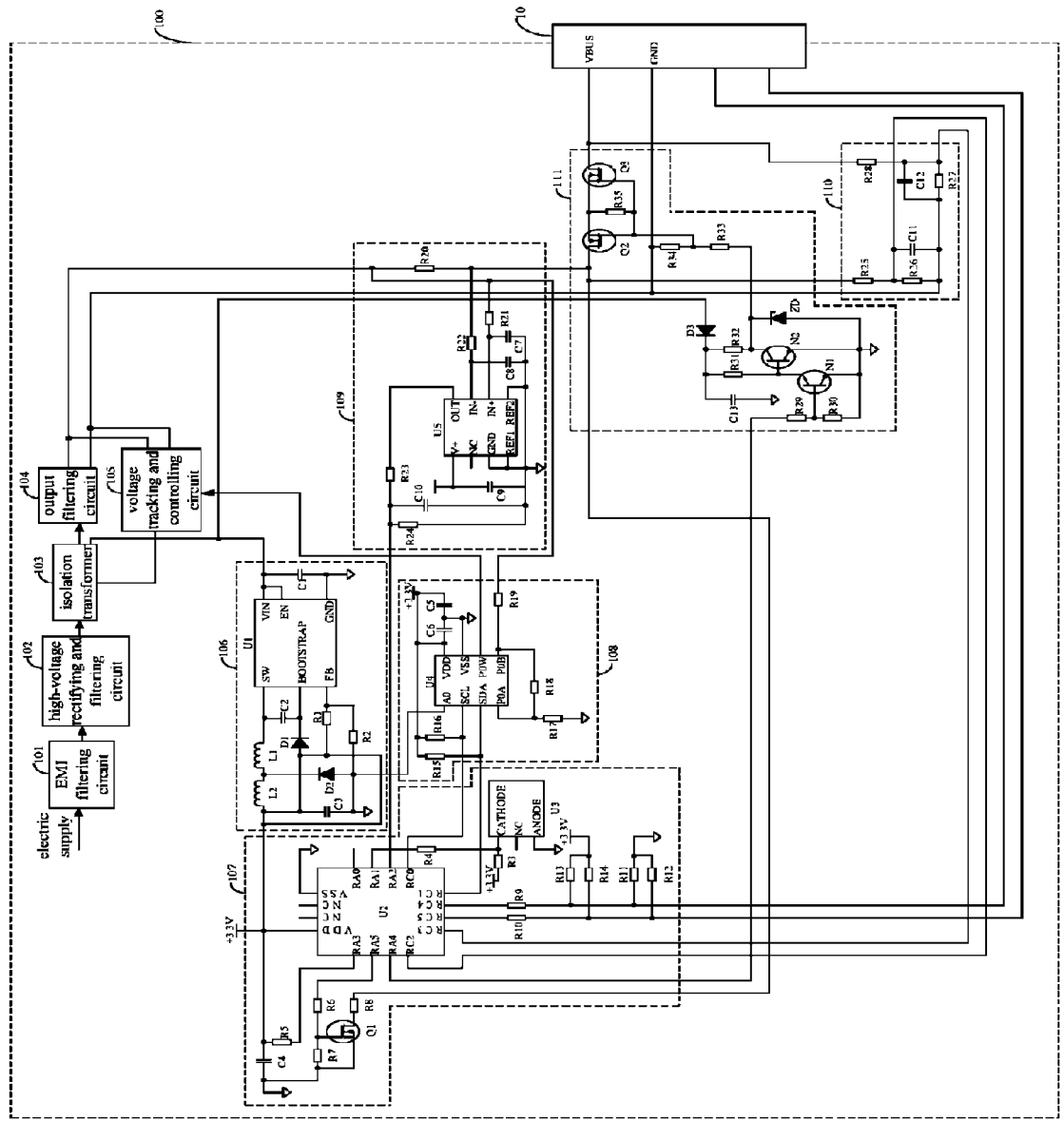
FIG. 2 is a schematic circuit diagram of a power adapter provided by an embodiment of the present disclosure.

Please refer to FIG. 1 and FIG. 2, an input end of the power circuit 106 is connected with a secondary end of the isolation transformer 103. A power end of the main control circuit 107, a power end of the potential adjusting circuit 108 and a power end of the current detection circuit 109 are collectively connected with an output end of the power circuit 106. Both a high-level end of the main control circuit 107 and a high-level end of the potential adjusting circuit 108 are connected with a positive output end of the output filtering circuit 104. The high-level end of the main control circuit 107 is connected with the positive output end of the output filtering circuit 104 via a second end of the twentieth resistor R20 (i.e., a direct current output end of the current detection circuit 109). A potential adjusting end of the potential adjusting circuit 108 is connected with the voltage tracking and controlling circuit 105. A direct current input end of the current detection circuit 109 is connected with the positive output end of the output filtering circuit 104. A current feedback end of the current detection circuit 109 is connected with a current detecting end of the main control circuit 107. A clock output end of the main control circuit 107 is connected with a clock input end of the potential adjusting circuit 108. A data output end of the main control circuit 107 is connected with a data input end of the potential adjusting circuit 108. A first detecting end and a second detecting end of the voltage detection circuit 110 are connected with the direct current output end of the current detection circuit 109 and a negative output end of the output filtering circuit 104 respectively. A first output end and a second output end of the voltage detection circuit 110 are connected with a first voltage detecting end and a second voltage detecting end of the main control circuit 107 respectively. An input end of the output switch circuit 111 is connected with the direct current output end of the current detection circuit 109; and an output end of the output switch circuit 111 is connected with a third detecting end of the voltage detection circuit 110. A ground end of the output switch circuit 111 is connected with the negative output end of the output filtering circuit 104. A controlled end of the output switch circuit 111 is connected with a switching control end of the main control circuit 107. A power end of the output switch circuit 111 is connected with the secondary end of the isolation transformer 103. Each of the negative output end of the output filtering circuit 104, the output end of the output switch circuit 111 and a first communication end and a second communication end of the main control circuit 107 is connected with the communication interface 10 of the power adapter 100.

The power circuit 106 obtains power supply from the isolation transformer 103 and provides the power supply for the main control circuit 107, the potential adjusting circuit 108 and the current detection circuit 109; when a quick charging is performed on the battery 201 in the electronic device 200, the potential adjusting circuit 108 drives the voltage tracking and controlling circuit 105 to adjust an output voltage of the isolation transformer 103 according to a control signal sent by the main control circuit 107; the current detection circuit 109 detects an output current of the power adapter 100 and feeds back a current detecting signal to the main control circuit 107, and the voltage detection circuit 110 detects an output voltage of the power adapter 100 and feeds back a voltage detecting signal to the main control circuit 107; the output switch circuit 111 turns on or off a direct current output of the power adapter 100 according to a switching control signal sent by the main control circuit 107.

When a conventional charging or a quick charging is performed on the battery 201 in the electronic device 200, the main control circuit 107 determines whether the output current of the power adapter 100 is greater than a current threshold according to the current detecting signal, and determines whether the output voltage of the power adapter 100 is greater than a voltage threshold according to the voltage detecting signal; if the output current of the power adapter 100 is greater than the current threshold and/or the output voltage of the power adapter 100 is greater than the voltage threshold, the main control circuit 107 controls the output switch circuit 111 to turn off the direct current output of the power adapter 100.

During the data communication between the main control circuit 107 and the electronic device 200, if the electronic device 200 determines that the output current of the power adapter 100 is greater than the current threshold and/or the output voltage of the power adapter 100 is greater than the voltage threshold, and feeds back a charging stop instruction to the main control circuit 107, the main control circuit 107 controls the output switch circuit 111 to turn off the direct current output of the power adapter 100 according to the charging stop instruction.

In at least one embodiment, the data communication between the main control circuit 107 and the electronic device 200 is performed during the charging. During this process, either in the conventional charging mode or in the quick charging mode, the main control circuit 107 would send the output current and output voltage of the power adapter 100 to the electronic device 200. The electronic device 200 determines according to the output current and output voltage of the power adapter 100 whether an overcurrent and/or overvoltage occur during the charging. The determine process is the same as the process in which the main control circuit 107 determines the output current and output voltage of the power adapter 100, such that the electronic device 200 may feedback a charging stop instruction for informing the main control circuit 107 of turning off the direct current output of the power adapter 100 when the electronic device 200 determines that an overcurrent and/or overvoltage occurs in the output of the power adapter 100. Moreover, the electronic device 200 may close its communication interface actively when determining that an overcurrent and/or overvoltage occurs in the output of the power adapter 100, so as to disconnect from the power adapter 100, such that the overcurrent and/or overvoltage protection may be realized actively.

FIG. 2 is a schematic circuit diagram of a power adapter provided by an embodiment of the present disclosure. For illustration purposes, only parts related to embodiments of the present disclosure are shown, which will be described in detail in the following.

The power circuit 106 includes: a first capacitor C1, a voltage stabilizing chip U1, a second capacitor C2, a first inductor L1, a second inductor L2, a first diode D1, a second diode D2, a third capacitor C3, a first resistor R1 and a second resistor R2.

A collective node of a first end of the first capacitor C1, an input power pin Vin and an enable pin EN of the voltage stabilizing chip U1 is configured as the input end of the power circuit 106. A second end of the first capacitor C1 and a ground pin GND of the voltage stabilizing chip U1 are collectively grounded. A switch pin SW of the voltage stabilizing chip U1 and a first end of the second capacitor C2 are collectively connected with a first end of the first inductor L1. An inside switch pin BOOST of the voltage stabilizing chip U1 and a second end of the second capacitor C2 are collectively connected with a cathode of the first diode D1. A feedback voltage pin FB of the voltage stabilizing chip U1 is connected with a first end of the first resistor R1 and a first end of the second resistor R2 respectively. A second end of the first inductor L1 and a cathode of the second diode D2 are collectively connected with a first end of the second inductor. A collective node formed by collectively connecting a second end of the second inductor L2, an anode of the first diode D1, a second end of the first resistor R1 and a first end of the third capacitor C3 is configured as the output end of the power circuit 106. An anode of the second diode D2, a second end of the second resistor R2 and a second end of the third capacitor C3 are collectively grounded. After using the voltage stabilizing chip U1 as a core to perform a voltage converting process on a voltage at the secondary end of the isolation transformer 103, the power circuit 106 outputs the voltage of +3.3V for providing power supply for the main control circuit 107, the potential adjusting circuit 108 and the current detection circuit 109. The voltage stabilizing chip U1 may be a buck DC/DC converter with a Model No. MCP16301.

The main control circuit 107 includes: a main control chip U2, a third resistor R3, a reference voltage chip U3, a fourth resistor R4, a fifth resistor R5, a fourth capacitor C4, a sixth resistor R6, a seventh resistor R7, a first NMOS transistor Q1, an eighth resistor R8, a ninth resistor R9, a tenth resistor R10, an eleventh resistor R11, a twelfth resistor R12, a thirteenth resistor R13 and a fourteenth resistor R14.

A power pin VDD of the main control chip U2 is configured as the power end of the main control circuit 107. A ground pin VSS of the main control chip U2 is grounded. A first input/output pin RA0 of the main control chip U2 is suspended. A first end of the third resistor R3 is connected with the power pin VDD of the main control chip U2. A second end of the third resistor R3 and a first end of the fourth resistor R4 are collectively connected with a cathode CATHODE of the reference voltage chip U3. An anode ANODE of the reference voltage chip U3 is grounded. A vacant pin NC of the reference voltage chip U3 is suspended. A second end of the fourth resistor R4 is connected with a second input/output pin RA1 of the main control chip U2. A third input/output pin RA2 of the main control chip U2 is configured as the current detecting end of the main control circuit 107. A fourth input/output pin RA3 of the main control chip U2 is connected with a first end of the fifth resistor R5. A second end of the fifth resistor R5 and a first end of the fourth capacitor C4 are collectively connected with the power pin VDD of the main control chip U2. A second end of the fourth capacitor C4 is grounded. A fifth input/output pin RA4 of the main control chip U2 is configured as the switching control end of the main control circuit 107. A sixth input/output pin RA5 of the main control chip U2 is connected with a first end of the sixth resistor R6. A second end of the sixth resistor R6 and a grid electrode of the first NMOS transistor Q1 are collectively connected with a first end of the seventh resistor R7. A second end of the seventh resistor R7 and a source electrode of the first NMOS transistor Q1 are collectively grounded. A drain electrode of the first NMOS transistor Q1 is connected with a first end of the eighth resistor R8. A second end of the eighth resistor R8 is configured as the high-level end of the main control circuit 107. A seventh input/output pin RC0 and an eighth input/output pin RC1 of the main control chip U2 are configured as the clock output end and the data output end of the main control circuit 107 respectively. A ninth input/output pin RC2 and a tenth input/output pin RC3 of the main control chip U2 are configured as the first voltage detecting end and the second voltage detecting end of the main control circuit 107 respectively. An eleventh input/output pin RC4 and a twelfth input/output pin RC5 of the main control chip U2 are connected with a first end of the ninth resistor R9 and a first end of the tenth resistor R10 respectively. A first end of the eleventh resistor R11 and a first end of the twelfth resistor R12 are connected with a second end of the ninth resistor R9 and a second end of the tenth resistor R10 respectively. A second end of the eleventh resistor R11 and a second end of the twelfth resistor R12 are collectively grounded. A first end of the thirteenth resistor R13 and a first end of the fourteenth resistor R14 are connected with the second end of the ninth resistor R9 and the second end of the tenth resistor R10 respectively. A second end of the thirteenth resistor R13 and a second end of the fourteenth resistor R14 are collectively connected with the power pin VDD of the main control chip U2. The second end of the ninth resistor R9 and the second end of the tenth resistor R10 are configured as the first communication end and the second communication end of the main control circuit 107 respectively. The main control chip U2 may be a single chip microcomputer with a Model No. PIC12LF1822, PIC12F1822, PIC16LF1823 or PIC16F1823, and the reference voltage chip U3 may be a voltage reference device with a Model No. LM4040.

The potential adjusting circuit 108 includes: a fifteenth resistor R15, a sixteenth resistor R16, a digital potentiometer U4, a seventeenth resistor R17, an eighteenth resistor R18, a fifth capacitor C5, a sixth capacitor C6 and a nineteenth resistor R19.

A collective node of a first end of the fifteenth resistor R15, a first end of the sixteenth resistor R16, a power pin VDD of the digital potentiometer U4 and a first end of the fifth capacitor C5 is configured as the power end of the potential adjusting circuit 108. A second end of the fifth capacitor C5, a first end of the sixth capacitor C6, a ground pin VSS of the digital potentiometer U4 and a first end of the seventeenth resistor R17 are collectively grounded. A second end of the sixth capacitor C6 is connected with the power pin VDD of the digital potentiometer U4. A collective node between a second end of the fifteenth resistor R15 and a serial data pin SDA of the digital potentiometer U4 is configured as the data input end of the potential adjusting circuit 108. A collective node between a second end of the sixteenth resistor R16 and a clock input pin SCL of the digital potentiometer U4 is configured as the clock input end of the potential adjusting circuit 108. An address zero pin A0 of the digital potentiometer U4 is grounded. A first potential wiring pin P0A of the digital potentiometer U4 and a first end of the eighteenth resistor R18 are collectively connected with a second end of the seventeenth resistor R17. A second end of the eighteenth resistor R18 and a second potential wiring pin P0B of the digital potentiometer U4 are collectively connected with a first end of the nineteenth resistor R19. A second end of the nineteenth resistor R19 is configured as the high-level end of potential adjusting circuit 108. A potential tap pin POW of the digital potentiometer U4 is configured as the potential adjusting end of the potential adjusting circuit 108. The digital potentiometer U4 adjusts an internal sliding variable resistor according to the clock signal and the data signal outputted by the main control chip U2, such that the potential at the tap end of the internal sliding variable resistor (i.e., the potential tap pin POW of the digital potentiometer U4) is changed, and then the voltage tracking and controlling circuit 105 adjusts the output voltage of the isolation transformer 103 by following the potential changes. The digital potentiometer U4 may be a digital potentiometer with a Model No. MCP45X1.

The current detection circuit 109 includes: a twentieth resistor R20, a twenty-first resistor R21, a twenty-second resistor R22, a seventh capacitor C7, an eighth capacitor C8, a current detection chip U5, a twenty-third resistor R23, a ninth capacitor C9, a tenth capacitor C10 and a twenty-fourth resistor R24.

A first end and a second end of the twentieth resistor R20 are configured as the direct current input end and the direct current output end of the current detection circuit 109 respectively. A first end of the twenty-first resistor R21 and a first end of the twenty-second resistor R22 are connected with a first end and a second end of the twentieth resistor R20 respectively. A second end of the twenty-first resistor R21 and a first end of the seventh capacitor C7 are collectively connected with a positive input pin IN+ of the current detection chip U5. A second end of the twenty-second resistor R22 and a first end of the eighth capacitor C8 are collectively connected with a negative input pin IN− of the current detection chip U5. A collective node between a power pin V+ of the current detection chip U5 and a first end of the ninth capacitor C9 is configured as the power end of the current detection circuit 109. A vacant pin NC of the current detection chip U5 is suspended. An output pin OUT of the current detection chip U5 is connected with a first end of the twenty-third resistor R23. A second end of the twenty-third resistor R23 is configured as the current feedback end of the current detection circuit 109. A first end of the tenth capacitor C10 and a first end of the twenty-fourth resistor R24 are collectively connected with the second end of the twenty-third resistor R23. A second end of the seventh capacitor C7, a second end of the eighth capacitor C8, a second end of the ninth capacitor C9, a second end of the tenth capacitor C10, a second end of the twenty-fourth resistor R24, a ground pin GND, a first reference voltage pin REF1 and a second reference voltage pin REF2 of the current detection chip U5 are collectively grounded. The twentieth resistor 20 used as a current detecting resistor samples the output current of the output filtering circuit 104 (i.e., the output current of the power adapter 100), and then the current detecting signal is outputted to the main control chip U2 by the current detection chip U5 according to the voltage between two ends of the twentieth resistor 20. The current detection chip U5 may be a current shunt monitor with a Model No. INA286.

The voltage detection circuit 110 includes: a twenty-fifth resistor R25, a twenty-sixth resistor R26, an eleventh capacitor C11, a twelfth capacitor C12, a twenty-seventh resistor R27 and a twenty-eighth resistor R28.

A first end of the twenty-fifth resistor R25 is configured as the first detecting end of the voltage detection circuit 110. A collective node of a second end of the twenty-fifth resistor R25, a first end of the twenty-sixth resistor R26 and a first end of the eleventh capacitor C11 is configured as a second output end of the voltage detection circuit 110. A second end of the twenty-sixth resistor R26 is configured as a second detecting end of the voltage detection circuit 110. A second end of the eleventh capacitor C11, a first end of the twelfth capacitor C12 and a first end of the twenty-seventh resistor R27 are collectively connected with the second end of the twenty-sixth resistor R26. A collective node of a second end of the twelfth capacitor C12, a second end of the twenty-seventh resistor R27 and a first end of the twenty-eighth resistor R28 is configured as the first output end of the voltage detection circuit 110. The second end of the twenty-eighth resistor R28 is configured as the third detecting end of the voltage detection circuit 110.

The output switch circuit 111 includes: a twenty-ninth resistor R29, a thirtieth resistor R30, a thirteen capacitor C13, a thirty-first resistor R31, a first NPN type transistor N1, a thirty-second resistor R32, a second NPN type transistor N2, a third diode D3, a voltage stabilizing diode ZD, a thirty-third resistor R33, a thirty-fourth resistor R34, a thirty-fifth resistor R35, a second NMOS transistor Q2 and a third NMOS transistor Q3.

A first end of the twenty-ninth resistor R29 is configured as the controlled end of the output switch circuit 111. A second end of the twenty-ninth resistor R29 and a first end of the thirtieth resistor R30 are collectively connected with a base of the first NPN type transistor N1. A first end of the thirteenth capacitor C13, a first end of the thirty-first resistor R31 and a first end of the thirty-second resistor R32 are collectively connected with a cathode of the third diode D3. An anode of the third diode D3 is configured as the power supply end of the output switch circuit 111. A second end of the thirty-first resistor R31 and a base of the second NPN type transistor N2 are collectively connected with a collector of the first NPN type transistor N1. The second end of the thirty-second resistor R32, a cathode of the voltage stabilizing diode ZD and a first end of the thirty-third resistor R33 are collectively connected with a collector of the second NPN type transistor N2. A second end of the thirtieth resistor R30, a second end of the thirteenth capacitor C13, an emitter of the first NPN type transistor N1, an emitter of the second NPN type transistor N2 and an anode of the voltage stabilizing diode ZD are collectively grounded. A second end of the thirty-third resistor R33, a first end of the thirty-fourth resistor R34, a first end of the thirty-fifth resistor R35, a grid electrode of the second NMOS transistor Q2 and a grid electrode of the third NMOS transistor Q3 are collectively connected. A second end of the thirty-fourth resistor R34 is configured as the ground end of the output switch circuit 111. A drain electrode of the second NMOS transistor Q2 is configured as the input end of the output switch circuit 111. A source electrode of the second NMOS transistor Q2 and a second end of the thirty-fifth resistor R35 are collectively connected with a source electrode of the third NMOS transistor Q3. A drain electrode of the third NMOS transistor Q3 is configured as the output end of the output switch circuit 111. The second NMOS transistor Q2 and the third NMOS transistor Q3 are switched on or off simultaneously so as to turn on or off the direct current output of the power adapter 100.

Based on the above-mentioned power adapter 100, embodiments of the present disclosure further provide an electronic device. The electronic device includes a battery 201 and is further provided with the above-mentioned power adapter 100.

In the present disclosure, the power adapter 100 including the power circuit 106, the main control circuit 107, the potential adjusting circuit 108, the current detection circuit 109, the voltage detection circuit 110 and the output switch circuit 111 is provided for the electronic device 200. The main control circuit 107 determines whether the output current of the power adapter 100 is greater than the current threshold, and determines whether the output voltage of the power adapter 100 is greater than the voltage threshold. If the output current of the power adapter 100 is greater than the current threshold and/or the output voltage of the power adapter 100 is greater than the voltage threshold, the main control circuit 107 controls the output switch circuit 111 to turn off the direct current output of the power adapter 100. In addition, if the electronic device 200 determines that an overcurrent and/or overvoltage occurs in the output of the power adapter 100, and feeds back the charging stop instruction to the main control circuit 107, the main control circuit 107 controls the output switch circuit 111 to turn off the direct current output of the power adapter 100 according to the charging stop instruction, such that the overcurrent and/or overvoltage protection is realized for the battery 201.

The forgoing description is only directed to preferred embodiments of the present disclosure, but not used to limit the present disclosure. All modifications, equivalents, variants and improvements made within the spirit and principle of the present disclosure shall fall within the protection scope of the present disclosure.

What is claimed is:

1. A power adapter, comprising a communication interface through which the power adapter charges a battery in an electronic device and performs a data communication with the electronic device, an EMI filtering circuit, a high-voltage rectifying and filtering circuit, an isolation transformer, an output filtering circuit, and a voltage tracking and controlling circuit, wherein, the power adapter further comprises a power circuit, a main control circuit, a potential adjusting circuit, a current detection circuit, a voltage detection circuit and an output switch circuit;

an input end of the power circuit is connected with a secondary end of the isolation transformer; a power end of the main control circuit, a power end of the potential adjusting circuit and a power end of the current detection circuit are collectively connected with an output end of the power circuit; both a high-level end of the main control circuit and a high-level end of the potential adjusting circuit are connected with a positive output end of the output filtering circuit; a potential adjusting end of the potential adjusting circuit is connected with the voltage tracking and controlling circuit; a direct current input end of the current detection circuit is connected with the positive output end of the output filtering circuit; a current feedback end of the current detection circuit is connected with a current detecting end of the main control circuit; a clock output end of the main control circuit is connected with a clock input end of the potential adjusting circuit; a data output end of the main control circuit is connected with a data input end of the potential adjusting circuit; a first detecting end and a second detecting end of the voltage detection circuit are connected with a direct current output end of the current detection circuit and a negative output end of the output filtering circuit respectively; a first output end and a second output end of the voltage detection circuit are connected with a first voltage detecting end and a second voltage detecting end of the main control circuit respectively; an input end of the output switch circuit is connected with the direct current output end of the current detection circuit; an output end of the output switch circuit is connected with a third detecting end of the voltage detection circuit; a ground end of the output switch circuit is connected with the negative output end of the output filtering circuit; a controlled end of the output switch circuit is connected with a switching control end of the main control circuit; a power end of the output switch circuit is connected with the secondary end of the isolation transformer; each of the negative output end of the output filtering circuit, the output end of the output switch circuit and a first communication end and a second communication end of the main control circuit is connected with the communication interface;

the power circuit obtains power supply from the isolation transformer and provides the power supply for the main control circuit, the potential adjusting circuit and the current detection circuit; when a quick charging is performed on the battery in the electronic device, the potential adjusting circuit drives the voltage tracking and controlling circuit to adjust an output voltage of the isolation transformer according to a control signal sent by the main control circuit; the current detection circuit detects an output current of the power adapter and feeds back a current detecting signal to the main control circuit, and the voltage detection circuit detects an output voltage of the power adapter and feeds back a voltage detecting signal to the main control circuit; the output switch circuit turns on or off a direct current output of the power adapter according to a switching control signal sent by the main control circuit;

when a conventional charging or a quick charging is performed on the battery in the electronic device, the main control circuit determines whether the output current of the power adapter is greater than a current threshold according to the current detecting signal and determines whether the output voltage of the power adapter is greater than a voltage threshold according to the voltage detecting signal; if the output current of the power adapter is greater than the current threshold and/or the output voltage of the power adapter is greater than the voltage threshold, the main control circuit controls the output switch circuit to turn off the direct current output of the power adapter;

during the data communication between the main control circuit and the electronic device, if the electronic device determines that the output current of the power adapter is greater than the current threshold and/or the output voltage of the power adapter is greater than the voltage threshold, and feeds back a charging stop instruction to the main control circuit, the main control circuit controls the output switch circuit to turn off the direct current output of the power adapter according to the charging stop instruction; and if the electronic device determines that an overcurrent and/or overvoltage occurs in the output of the power adapter, the electronic device turns off the communication interface thereof actively so as to turn off a connection to the power adapter.

2. The power adapter according to claim 1, wherein, the power circuit comprises: a first capacitor, a voltage stabilizing chip, a second capacitor, a first inductor, a second inductor, a fist diode, a second diode, a third capacitor, a first resistor and a second resistor;

a collective node of a first end of the first capacitor, an input power pin and an enable pin of the voltage stabilizing chip is configured as the input end of the power circuit, a second end of the first capacitor and a ground pin of the voltage stabilizing chip are collectively grounded, a switch pin of the voltage stabilizing chip and a first end of the second capacitor are collectively connected with a first end of the first inductor; an inside switch pin of the voltage stabilizing chip and a second end of the second capacitor are collectively connected with a cathode of the first diode; a feedback voltage pin of the voltage stabilizing chip is connected with a first end of the first resistor and a first end of the second resistor respectively; a second end of the first inductor and a cathode of the second diode are collectively connected with a first end of the second inductor; a collective node formed by collectively connecting a second end of the second inductor, an anode of the first diode, a second end of the first resistor and a first end of the third capacitor is configured as the output end of the power circuit, an anode of the second diode, a second end of the second resistor and a second end of the third capacitor are collectively grounded.

3. The power adapter according to claim 1, wherein, the main control circuit comprises: a main control chip, a third resistor, a reference voltage chip, a fourth resistor, a fifth resistor, a fourth capacitor, a sixth resistor, a seventh resistor, a first NMOS transistor, an eighth resistor, a ninth resistor, a tenth resistor, an eleventh resistor, a twelfth resistor, a thirteenth resistor and a fourteenth resistor;

a power pin of the main control chip is configured as the power end of the main control circuit; a ground pin of the main control chip is grounded; a first input/output pin of the main control chip is suspended; a first end of the third resistor is connected with the power pin of the main control chip; a second end of the third resistor and a first end of the fourth resistor are collectively connected with a positive terminal of the reference voltage chip; a negative terminal of the reference voltage chip is grounded; a vacant pin of the reference voltage chip U3 is suspended; a second end of the fourth resistor is connected with a second input/output pin of the main control chip; a third input/output pin of the main control chip is configured as the current detecting end of the main control circuit; a fourth input/output pin of the main control chip is connected with a first end of the fifth resistor; a second end of the fifth resistor and a first end of the fourth capacitor are collectively connected with the power pin of the main control chip; a second end of the fourth capacitor is grounded; a fifth input/output pin of the main control chip is configured as the switching control end of the main control circuit; a sixth input/output pin of the main control chip is connected with a first end of the sixth resistor; a second end of the sixth resistor and a grid electrode of the first NMOS transistor are collectively connected with a first end of the seventh resistor; a second end of the seventh resistor and a source electrode of the first NMOS transistor are collectively grounded; a drain electrode of the first NMOS transistor is connected with a first end of the eighth resistor; a second end of the eighth resistor is configured as the high-level end of the main control circuit; a seventh input/output pin and an eighth input/output pin of the main control chip are configured as the clock output end and the data output end of the main control circuit respectively; a tenth input/output pin and a ninth input/output pin of the main control chip are configured as the first voltage detecting end and the second voltage detecting end of the main control circuit respectively; an eleventh input/output pin and a twelfth input/output pin of the main control chip are connected with a first end of the ninth resistor and a first end of the tenth resistor respectively; a first end of the eleventh resistor and a first end of the twelfth resistor are connected with a second end of the ninth resistor and a second end of the tenth resistor respectively; a second end of the eleventh resistor and a second end of the twelfth resistor are collectively grounded; a first end of the thirteenth resistor and a first end of the fourteenth resistor are connected with the second end of the ninth resistor and the second end of the tenth resistor respectively; a second end of the thirteenth resistor and a second end of the fourteenth resistor are collectively connected with the power pin of the main control chip; the second end of the ninth resistor and the second end of the tenth resistor are configured as the first communication end and the second communication end of the main control circuit respectively.

4. The power adapter according to claim 1, wherein,
the potential adjusting circuit comprises: a fifteenth resistor, a sixteenth resistor, a digital potentiometer, a seventeenth resistor, an eighteenth resistor, a fifth capacitor, a sixth capacitor and a nineteenth resistor;
a collective node of a first end of the fifteenth resistor, a first end of the sixteenth resistor, a power pin of the digital potentiometer and a first end of the fifth capacitor is configured as the power end of the potential adjusting circuit; a second end of the fifth capacitor, a first end of the sixth capacitor, a ground pin of the digital potentiometer and a first end of the seventeenth resistor are collectively grounded; a second end of the sixth capacitor is connected with the power pin of the digital potentiometer; a collective node between a second end of the fifteenth resistor and a serial data pin of the digital potentiometer is configured as the data input end of the potential adjusting circuit; a collective node between a second end of the sixteenth resistor and a clock input pin of the digital potentiometer is configured as the clock input end of the potential adjusting circuit; an address zero pin of the digital potentiometer is grounded; a first potential wiring pin of the digital potentiometer and a first end of the eighteenth resistor are collectively connected with a second end of the seventeenth resistor; a second end of the eighteenth resistor and a second potential wiring pin of the digital potentiometer are collectively connected with a first end of the nineteenth resistor; a second end of the nineteenth resistor is configured as the high-level end of potential adjusting circuit; a potential tap pin of the digital potentiometer is configured as the potential adjusting end of the potential adjusting circuit.

5. The power adapter according to claim 1, wherein,
the current detection circuit comprises: a twentieth resistor, a twenty-first resistor, a twenty-second resistor, a seventh capacitor, an eighth capacitor, a current detection chip, a twenty-third resistor, a ninth capacitor, a tenth capacitor and a twenty-fourth resistor;
a first end and a second end of the twentieth resistor are configured as the direct current input end and the direct current output end of the current detection circuit respectively; a first end of the twenty-first resistor and a first end of the twenty-second resistor are connected with a first end and a second end of the twentieth resistor respectively; a second end of the twenty-first resistor and a first end of the seventh capacitor are collectively connected with a positive input pin of the current detection chip; a second end of the twenty-second resistor and a first end of the eighth capacitor are collectively connected with a negative input pin of the current detection chip; a collective node between a power pin of the current detection chip and a first end of the ninth capacitor is configured as the power end of the current detection circuit; a vacant pin of the current detection chip is suspended; an output pin of the current detection chip is connected with a first end of the twenty-third resistor, a second end of the twenty-third resistor is configured as the current feedback end of the current detection circuit; a first end of the tenth capacitor and a first end of the twenty-fourth resistor are collectively connected with the second end of the twenty-third resistor; a second end of the seventh capacitor, a second end of the eighth capacitor, a second end of the ninth capacitor, a second end of the tenth capacitor, a second end of the twenty-fourth resistor, a ground pin, a first reference voltage pin and a second reference voltage pin of the current detection chip are collectively grounded.

6. The power adapter according to claim 1, wherein,
the voltage detection circuit comprises: a twenty-fifth resistor, a twenty-sixth resistor, an eleventh capacitor, a twelfth capacitor, a twenty-seventh resistor and a twenty-eighth resistor;
a first end of the twenty-fifth resistor is configured as the first detecting end of the voltage detection circuit; a collective node of a second end of the twenty-fifth resistor, a first end of the twenty-sixth resistor and a first end of the eleventh capacitor is configured as the second output end of the voltage detection circuit; a second end of the twenty-sixth resistor is configured as the second detecting end of the voltage detection circuit; a second end of the eleventh capacitor, a first end of the twelfth capacitor and a first end of the twenty-seventh resistor are collectively connected with the second end of the twenty-sixth resistor; a collective node of a second end of the twelfth capacitor, a second end of the twenty-seventh resistor and a first end of the twenty-eighth resistor is configured as the first output end of the voltage detection circuit; the second end of the twenty-eighth resistor is configured as the third detecting end of the voltage detection circuit.

7. The power adapter according to claim 1, wherein,
the output switch circuit comprises: a twenty-ninth resistor, a thirtieth resistor, a thirteen capacitor, a thirty-first resistor, a first NPN type transistor, a thirty-second resistor, a second NPN type transistor, a third diode, a voltage stabilizing diode, a thirty-third resistor, a thirty-fourth resistor, a thirty-fifth resistor, a second NMOS transistor and a third NMOS transistor;
a first end of the twenty-ninth resistor is configured as the controlled end of the output switch circuit; a second end of the twenty-ninth resistor and a first end of the thirtieth resistor are collectively connected with a base of the first NPN type transistor; a first end of the thirteen capacitor, a first end of the thirty-first resistor and a first end of the thirty-second resistor are collectively connected with a cathode of the third diode; an anode of the third diode is configured as the power end of the output switch circuit; a second end of the thirty-first resistor and a base of the second NPN type transistor are collectively connected with a collector of the first NPN type transistor; a second end of the thirty-second resistor, a cathode of the voltage stabilizing diode and a first end of the thirty-third resistor are collectively connected with a collector of the second NPN type transistor; a second end of the thirtieth resistor, a second end of the thirteenth capacitor, an emitter of the first NPN type transistor, an emitter of the second NPN type transistor and an anode of the voltage stabilizing diode are collectively grounded; a second end of the thirty-third resistor, a first end of the thirty-fourth resistor, a first end of the thirty-fifth resistor, a grid electrode of the second NMOS transistor and a grid electrode of the third NMOS transistor are collectively connected; a second end of the thirty-fourth resistor is configured as the ground end of the output switch circuit; a drain electrode of the second NMOS transistor is configured as the input end of the output switch circuit; a source electrode of the second NMOS transistor and a second end of the thirty-fifth resistor are collectively connected with a source electrode of the third NMOS transistor; a drain electrode of the third NMOS transistor is configured as the output end of the output switch circuit.

8. An electronic device, comprising a battery and a power adapter, wherein
the power adapter comprises a communication interface through which the power adapter charges a battery in an electronic device and performs a data communication with the electronic device, an EMI filtering circuit, a high-voltage rectifying and filtering circuit, an isolation transformer, an output filtering circuit, and a voltage tracking and controlling circuit;
the power adapter further comprises a power circuit, a main control circuit, a potential adjusting circuit, a current detection circuit, a voltage detection circuit and an output switch circuit;
an input end of the power circuit is connected with a secondary end of the isolation transformer; a power end of the main control circuit, a power end of the potential adjusting circuit and a power end of the current detection circuit are collectively connected with an output end of the power circuit; both a high-level end of the main control circuit and a high-level end of the potential adjusting circuit are connected with a positive output end of the output filtering circuit; a potential adjusting end of the potential adjusting circuit is connected with the voltage tracking and controlling circuit; a direct current input end of the current detection circuit is connected with the positive output end of the output filtering circuit; a current feedback end of the current detection circuit is connected with a current detecting end of the main control circuit; a clock output end of the main control circuit is connected with a clock input end of the potential adjusting circuit; a data output end of the main control circuit is connected with a data input end of the potential adjusting circuit; a first detecting end and a second detecting end of the voltage detection circuit are connected with a direct current output end of the current detection circuit and a negative output end of the output filtering circuit respectively; a first output end and a second output end of the voltage detection circuit are connected with a first voltage detecting end and a second voltage detecting end of the main control circuit respectively; an input end of the output switch circuit is connected with the direct current output end of the current detection circuit; an output end of the output switch circuit is connected with a third detecting end of the voltage detection circuit; a ground end of the output switch circuit is connected with the negative output end of the output filtering circuit; a controlled end of the output switch circuit is connected with a switching control end of the main control circuit; a power end of the output switch circuit is connected with the secondary end of the isolation transformer; each of the negative output end of the output filtering circuit, the output end of the output switch circuit and a first communication end and a second communication end of the main control circuit is connected with the communication interface;
the power circuit obtains power supply from the isolation transformer and provides the power supply for the main control circuit, the potential adjusting circuit and the current detection circuit; when a quick charging is performed on the battery in the electronic device, the potential adjusting circuit drives the voltage tracking and controlling circuit to adjust an output voltage of the isolation transformer according to a control signal sent by the main control circuit; the current detection circuit detects an output current of the power adapter and feeds back a current detecting signal to the main control circuit, and the voltage detection circuit detects an output voltage of the power adapter and feeds back a voltage detecting signal to the main control circuit; the output switch circuit turns on or off a direct current output of the power adapter according to a switching control signal sent by the main control circuit;
when a conventional charging or a quick charging is performed on the battery in the electronic device, the main control circuit determines whether the output current of the power adapter is greater than a current threshold according to the current detecting signal and determines whether the output voltage of the power adapter is greater than a voltage threshold according to the voltage detecting signal; if the output current of the power adapter is greater than the current threshold and/or the output voltage of the power adapter is greater than the voltage threshold, the main control circuit controls the output switch circuit to turn off the direct current output of the power adapter;
during the data communication between the main control circuit and the electronic device, if the electronic device determines that the output current of the power adapter is greater than the current threshold and/or the output voltage of the power adapter is greater than the voltage threshold, and feeds back a charging stop instruction to the main control circuit, the main control circuit controls the output switch circuit to turn off the direct current output of the power adapter according to the charging stop instruction; and
if the electronic device determines that an overcurrent and/or overvoltage occurs in the output of the power adapter, the electronic device turns off the communication interface thereof actively so as to turn off a connection to the power adapter.

9. The electronic device according to claim 8, wherein,
the power circuit comprises: a first capacitor, a voltage stabilizing chip, a second capacitor, a first inductor, a second inductor, a fist diode, a second diode, a third capacitor, a first resistor and a second resistor;
a collective node of a first end of the first capacitor, an input power pin and an enable pin of the voltage stabilizing chip is configured as the input end of the power circuit, a second end of the first capacitor and a ground pin of the voltage stabilizing chip are collectively grounded, a switch pin of the voltage stabilizing chip and a first end of the second capacitor are collectively connected with a first end of the first inductor; an inside switch pin of the voltage stabilizing chip and a second end of the second capacitor are collectively connected with a cathode of the first diode; a feedback voltage pin of the voltage stabilizing chip is connected with a first end of the first resistor and a first end of the second resistor respectively; a second end of the first inductor and a cathode of the second diode are collectively connected with a first end of the second inductor; a collective node formed by collectively connecting a second end of the second inductor, an anode of the first diode, a second end of the first resistor and a first end of the third capacitor is configured as the output end of the power circuit, an anode of the second diode, a second end of the second resistor and a second end of the third capacitor are collectively grounded.

10. The electronic device according to claim 8, wherein, the main control circuit comprises: a main control chip, a third resistor, a reference voltage chip, a fourth resistor, a fifth resistor, a fourth capacitor, a sixth resistor, a seventh resistor, a first NMOS transistor, an eighth resistor, a ninth resistor, a tenth resistor, an eleventh resistor, a twelfth resistor, a thirteenth resistor and a fourteenth resistor;

a power pin of the main control chip is configured as the power end of the main control circuit; a ground pin of the main control chip is grounded; a first input/output pin of the main control chip is suspended; a first end of the third resistor is connected with the power pin of the main control chip; a second end of the third resistor and a first end of the fourth resistor are collectively connected with a positive terminal of the reference voltage chip; a negative terminal of the reference voltage chip is grounded; a vacant pin of the reference voltage chip U3 is suspended; a second end of the fourth resistor is connected with a second input/output pin of the main control chip; a third input/output pin of the main control chip is configured as the current detecting end of the main control circuit; a fourth input/output pin of the main control chip is connected with a first end of the fifth resistor; a second end of the fifth resistor and a first end of the fourth capacitor are collectively connected with the power pin of the main control chip; a second end of the fourth capacitor is grounded; a fifth input/output pin of the main control chip is configured as the switching control end of the main control circuit; a sixth input/output pin of the main control chip is connected with a first end of the sixth resistor; a second end of the sixth resistor and a grid electrode of the first NMOS transistor are collectively connected with a first end of the seventh resistor; a second end of the seventh resistor and a source electrode of the first NMOS transistor are collectively grounded; a drain electrode of the first NMOS transistor is connected with a first end of the eighth resistor; a second end of the eighth resistor is configured as the high-level end of the main control circuit; a seventh input/output pin and an eighth input/output pin of the main control chip are configured as the clock output end and the data output end of the main control circuit respectively; a tenth input/output pin and a ninth input/output pin of the main control chip are configured as the first voltage detecting end and the second voltage detecting end of the main control circuit respectively; an eleventh input/output pin and a twelfth input/output pin of the main control chip are connected with a first end of the ninth resistor and a first end of the tenth resistor respectively; a first end of the eleventh resistor and a first end of the twelfth resistor are connected with a second end of the ninth resistor and a second end of the tenth resistor respectively; a second end of the eleventh resistor and a second end of the twelfth resistor are collectively grounded; a first end of the thirteenth resistor and a first end of the fourteenth resistor are connected with the second end of the ninth resistor and the second end of the tenth resistor respectively; a second end of the thirteenth resistor and a second end of the fourteenth resistor are collectively connected with the power pin of the main control chip; the second end of the ninth resistor and the second end of the tenth resistor are configured as the first communication end and the second communication end of the main control circuit respectively.

11. The electronic device according to claim 8, wherein, the potential adjusting circuit comprises: a fifteenth resistor, a sixteenth resistor, a digital potentiometer, a seventeenth resistor, an eighteenth resistor, a fifth capacitor, a sixth capacitor and a nineteenth resistor;

a collective node of a first end of the fifteenth resistor, a first end of the sixteenth resistor, a power pin of the digital potentiometer and a first end of the fifth capacitor is configured as the power end of the potential adjusting circuit; a second end of the fifth capacitor, a first end of the sixth capacitor, a ground pin of the digital potentiometer and a first end of the seventeenth resistor are collectively grounded; a second end of the sixth capacitor is connected with the power pin of the digital potentiometer; a collective node between a second end of the fifteenth resistor and a serial data pin of the digital potentiometer is configured as the data input end of the potential adjusting circuit; a collective node between a second end of the sixteenth resistor and a clock input pin of the digital potentiometer is configured as the clock input end of the potential adjusting circuit; an address zero pin of the digital potentiometer is grounded; a first potential wiring pin of the digital potentiometer and a first end of the eighteenth resistor are collectively connected with a second end of the seventeenth resistor; a second end of the eighteenth resistor and a second potential wiring pin of the digital potentiometer are collectively connected with a first end of the nineteenth resistor; a second end of the nineteenth resistor is configured as the high-level end of potential adjusting circuit; a potential tap pin of the digital potentiometer is configured as the potential adjusting end of the potential adjusting circuit.

12. The electronic device according to claim 8, wherein, the current detection circuit comprises: a twentieth resistor, a twenty-first resistor, a twenty-second resistor, a seventh capacitor, an eighth capacitor, a current detection chip, a twenty-third resistor, a ninth capacitor, a tenth capacitor and a twenty-fourth resistor;

a first end and a second end of the twentieth resistor are configured as the direct current input end and the direct current output end of the current detection circuit respectively; a first end of the twenty-first resistor and a first end of the twenty-second resistor are connected with a first end and a second end of the twentieth resistor respectively; a second end of the twenty-first resistor and a first end of the seventh capacitor are collectively connected with a positive input pin of the current detection chip; a second end of the twenty-second resistor and a first end of the eighth capacitor are collectively connected with a negative input pin of the current detection chip; a collective node between a power pin of the current detection chip and a first end of the ninth capacitor is configured as the power end of the current detection circuit; a vacant pin of the current detection chip is suspended; an output pin of the current detection chip is connected with a first end of the twenty-third resistor, a second end of the twenty-third resistor is configured as the current feedback end of the current detection circuit; a first end of the tenth capacitor and a first end of the twenty-fourth resistor are collectively connected with the second end of the twenty-third resistor; a second end of the seventh capacitor, a second end of the eighth capacitor, a second end of the ninth capacitor, a second end of the tenth capacitor, a second end of the twenty-fourth resistor, a ground pin, a first reference voltage pin and a second reference voltage pin of the current detection chip are collectively grounded.

13. The electronic device according to claim 8, wherein, the voltage detection circuit comprises: a twenty-fifth resistor, a twenty-sixth resistor, an eleventh capacitor, a twelfth capacitor, a twenty-seventh resistor and a twenty-eighth resistor;

a first end of the twenty-fifth resistor is configured as the first detecting end of the voltage detection circuit; a collective node of a second end of the twenty-fifth resistor, a first end of the twenty-sixth resistor and a first end of the eleventh capacitor is configured as the second output end of the voltage detection circuit; a second end of the twenty-sixth resistor is configured as the second detecting end of the voltage detection circuit; a second end of the eleventh capacitor, a first end of the twelfth capacitor and a first end of the twenty-seventh resistor are collectively connected with the second end of the twenty-sixth resistor; a collective node of a second end of the twelfth capacitor, a second end of the twenty-seventh resistor and a first end of the twenty-eighth resistor is configured as the first output end of the voltage detection circuit; the second end of the twenty-eighth resistor is configured as the third detecting end of the voltage detection circuit.

14. The electronic device according to claim 8, wherein, the output switch circuit comprises: a twenty-ninth resistor, a thirtieth resistor, a thirteen capacitor, a thirty-first resistor, a first NPN type transistor, a thirty-second resistor, a second NPN type transistor, a third diode, a voltage stabilizing diode, a thirty-third resistor, a thirty-fourth resistor, a thirty-fifth resistor, a second NMOS transistor and a third NMOS transistor;

a first end of the twenty-ninth resistor is configured as the controlled end of the output switch circuit; a second end of the twenty-ninth resistor and a first end of the thirtieth resistor are collectively connected with a base of the first NPN type transistor; a first end of the thirteen capacitor, a first end of the thirty-first resistor and a first end of the thirty-second resistor are collectively connected with a cathode of the third diode; an anode of the third diode is configured as the power end of the output switch circuit; a second end of the thirty-first resistor and a base of the second NPN type transistor are collectively connected with a collector of the first NPN type transistor; a second end of the thirty-second resistor, a cathode of the voltage stabilizing diode and a first end of the thirty-third resistor are collectively connected with a collector of the second NPN type transistor; a second end of the thirtieth resistor, a second end of the thirteenth capacitor, an emitter of the first NPN type transistor, an emitter of the second NPN type transistor and an anode of the voltage stabilizing diode are collectively grounded; a second end of the thirty-third resistor, a first end of the thirty-fourth resistor, a first end of the thirty-fifth resistor, a grid electrode of the second NMOS transistor and a grid electrode of the third NMOS transistor are collectively connected; a second end of the thirty-fourth resistor is configured as the ground end of the output switch circuit; a drain electrode of the second NMOS transistor is configured as the input end of the output switch circuit; a source electrode of the second NMOS transistor and a second end of the thirty-fifth resistor are collectively connected with a source electrode of the third NMOS transistor; a drain electrode of the third NMOS transistor is configured as the output end of the output switch circuit.

\* \* \* \* \*